United States Patent [19]
Choi et al.

[11] Patent Number: 5,472,151
[45] Date of Patent: Dec. 5, 1995

[54] FAST WINDING DEVICE FOR VIDEO CASSETTE TAPE RECORDER

[75] Inventors: Jeong D. Choi; In K. Cheon, both of Seoul; Geun H. Song, Kyungki; Hee Y. Park, Seoul, all of Rep. of Korea

[73] Assignee: Goldstar Co., Ltd., Seoul, Rep. of Korea

[21] Appl. No.: 154,796

[22] Filed: Nov. 19, 1993

[30] Foreign Application Priority Data

Nov. 21, 1992 [KR] Rep. of Korea .................. 21992/1992

[51] Int. Cl.⁶ .................................................. G11B 15/44
[52] U.S. Cl. ...................... 242/356.4; 242/355.1; 360/96.3
[58] Field of Search ................ 242/356.3, 356.4, 242/356, 355.1, 390.8, 545, 564, 390.9; 360/96.3, 96.4, 85, 93

[56] References Cited

U.S. PATENT DOCUMENTS

| | | | |
|---|---|---|---|
| 4,563,711 | 1/1986 | Takai | 242/356.4 X |
| 4,591,935 | 5/1986 | Konda | 242/356.4 X |
| 4,720,755 | 1/1988 | Kamiyo | 242/356.4 X |

*Primary Examiner*—John Q. Nguyen
*Attorney, Agent, or Firm*—Birch, Stewart, Kolasch & Birch

[57] ABSTRACT

A fast winding device for a video cassette tape recorder capable of achieving a fast winding operation at both of tape loading and unloading states by use of a fast winding plate having an extension to which a FF/REW gear is mounted. The device includes an actuating plate mounted on a lower surface of a base plate to move linearly laterally, the actuating plate having a first fast winding actuating groove and a second fast winding actuating groove, a fast winding mode plate disposed between the base plate and the actuating plate to move laterally linearly, a fast return spring for returning the fast winding mode plate to an original position, a FF/REW gear rotatably mounted to an extension of the fast winding mode plate and directly engaged with an idler mechanism, a spring for resiliently supporting a lock lever mounted to the fast winding mode plate, and a ratchet mounted to the fast winding mode plate and adapted to release a locking state of the lock lever.

4 Claims, 17 Drawing Sheets

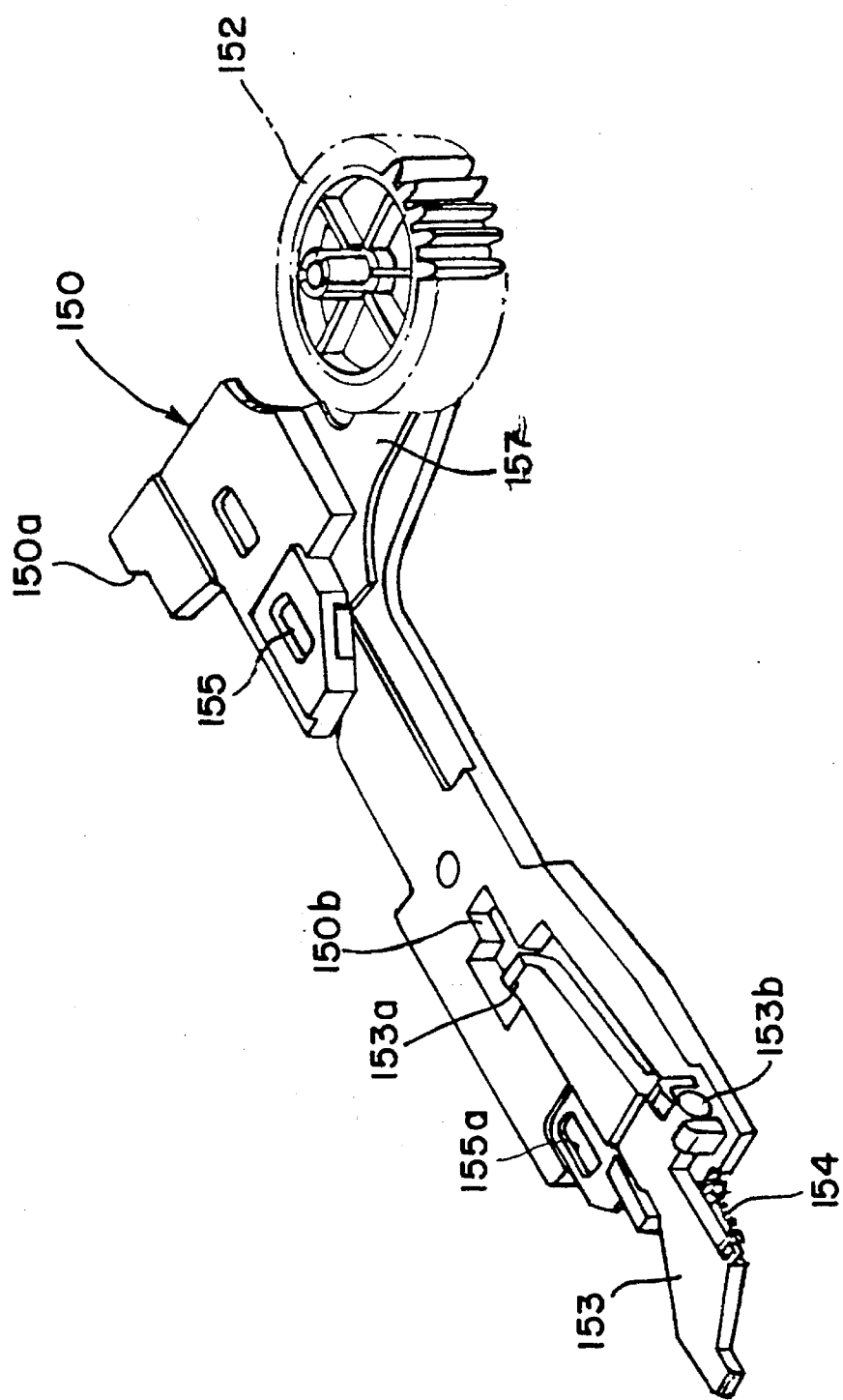

5,472,151

FAST WINDING DEVICE FOR VIDEO CASSETTE TAPE RECORDER

BACKGROUND OF THE INVENTION

1. Field of the Invention

The present invention relates to a video cassette tape recorder, and more particularly to a fast winding device for a video cassette tape recorder.

2. Description of the Prior Art

In deck mechanisms of conventional video cassette tape recorders, a fast winding operation in a normal direction or a reverse direction is achieved by engaging a clutch gear, called a slip gear, of an idler with a fastforward/rewind (FF/REW), gear rotatably mounted to a movable lever under a condition that brakes for supply and take-up reels which are released by a sudden-brake actuating plate operatively connected to a mode switching function plate are released, so as to prevent a slip during the fast winding operation. However, such a construction is complex because the FF/REW gear and the sudden-brake actuating plate are separated from each other. In a conventional deck mechanism, moreover, the fast winding operation can be performed only at a tape unloading state of the sudden-brake actuating plate.

SUMMARY OF THE INVENTION

Therefore, an object of the invention is to provide a fast winding device for a video cassette tape recorder capable of achieving a fast winding operation at both of tape loading and unloading states by use of a fast winding plate having an extension to which a FF/REW gear is mounted, thereby enabling a user to select the fast winding operation mode at both of tape loading and unloading states.

In accordance with the present invention, this object can be accomplished by providing a fast winding device for a video cassette tape recorder comprising: an actuating plate mounted on a lower surface of a base plate to move linearly laterally, said actuating plate having a first fast winding actuating groove and a second fast winding actuating groove; a fast winding mode plate disposed between said base plate and said actuating plate to move laterally linearly; a fast return spring for returning said fast winding mode plate to an original position; a FF/REW gear rotatably mounted to an extension of the fast winding mode plate and directly engaged with an idler mechanism; a spring for resiliently supporting a lock lever mounted to the fast winding mode plate; and a ratchet mounted to the fast winding mode plate and adapted to release a locking state of said lock lever.

BRIEF DESCRIPTION OF THE DRAWINGS

Other objects and aspects of the invention will become apparent from the following description of embodiments with reference to the accompanying drawings in which:

FIGS. 1 through 22 illustrate a construction of a video cassette tape recorder in accordance with the present invention and its operation, respectively;

FIG. 1 is a schematic plan view of the overall construction;

FIG. 2 is a perspective plan view of the overall construction;

FIG. 3 is a perspective bottom view of the overall construction;

FIG. 4 is a plan view of the overall construction;

FIG. 5 is a bottom view of the overall construction;

FIG. 6 is a bottom view of a mode change unit, showing its tape unloading condition;

FIG. 7 is a bottom view of the mode change unit, showing its fast winding mode condition;

FIG. 8 is a sectional front view of FIG. 6;

FIGS. 9A and 9B are views showing the fast winding mode operation, respectively, wherein FIG. 9A shows a condition that a lock gear is engaged with a ratchet, and FIG. 9B shows a condition that the lock gear is disengaged from the ratchet;

FIG. 10 is a partial sectional view of the ratchet;

FIG. 11 is an exploded perspective view of a jog clutch gear;

FIG. 12 is an assembled sectional view of the jog clutch gear;

FIG. 13 is a plan view of a tension adjusting mechanism;

FIG. 14A is a plan view of a mode sensing and driving assembly;

FIG. 14B is a sectional view of the mode sensing and driving assembly;

FIG. 15 is a side view of a front loading housing and its driving unit;

FIG. 16 is a plan view of a take-up arm having a gear portion;

FIG. 19 is a perspective view of an actuating plate;

FIG. 21 illustrates various positions of brake-actuating protrusions respectively corresponding to various operation modes; and FIG. 22 is a graph showing the progress of operation modes.

DETAILED DESCRIPTION OF THE PREFERRED EMBODIMENTS

Figure 1:
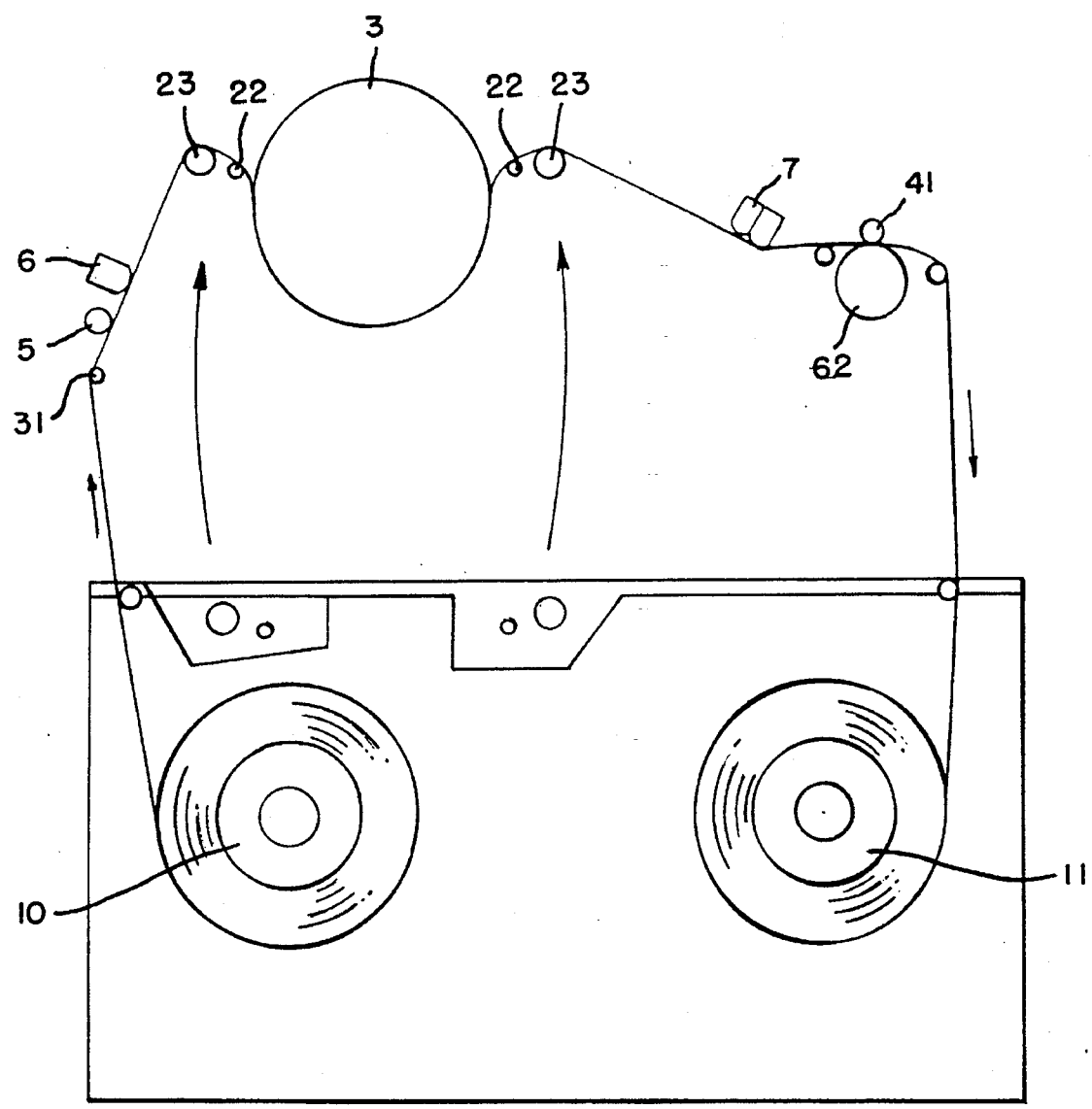
Figure 2:
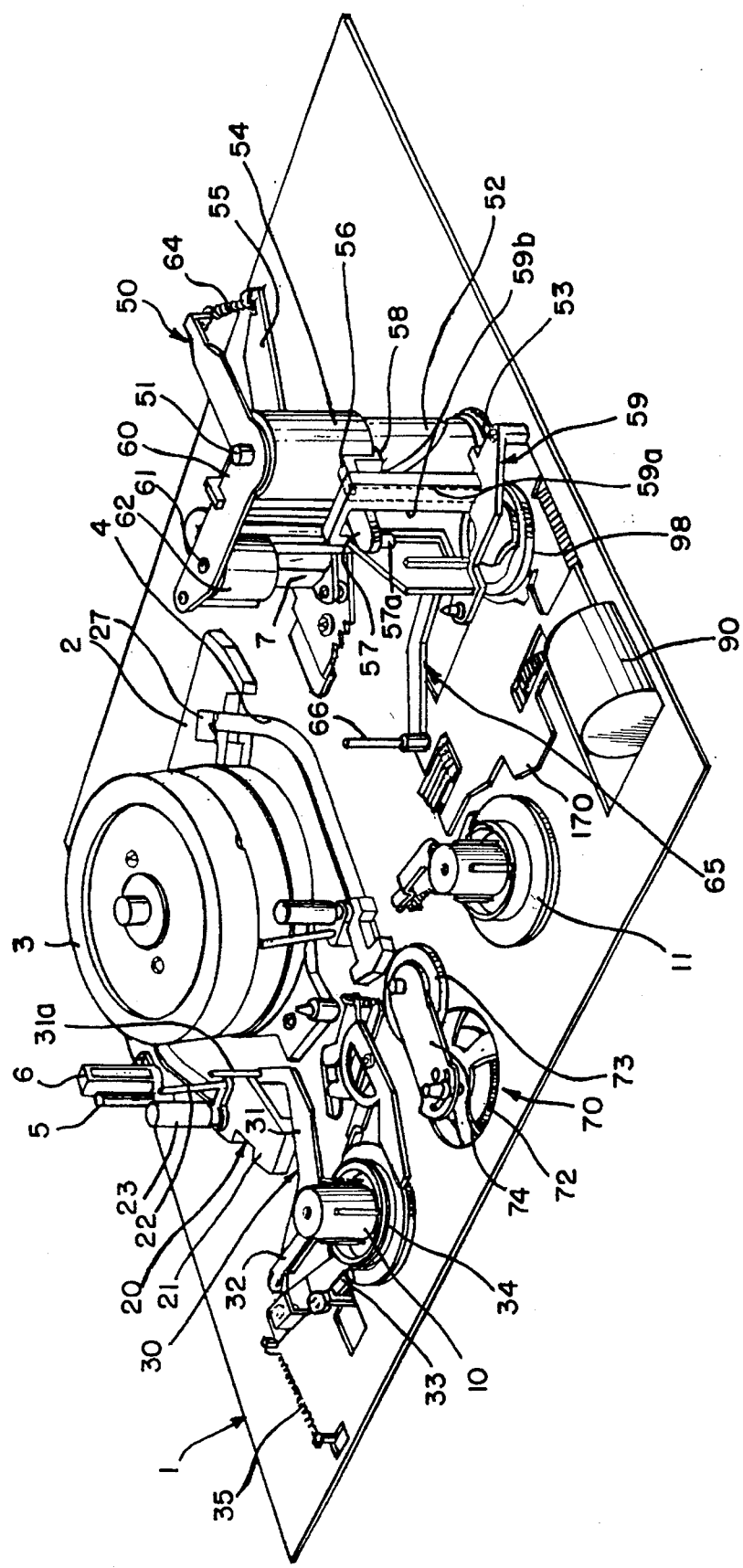
Figure 3:
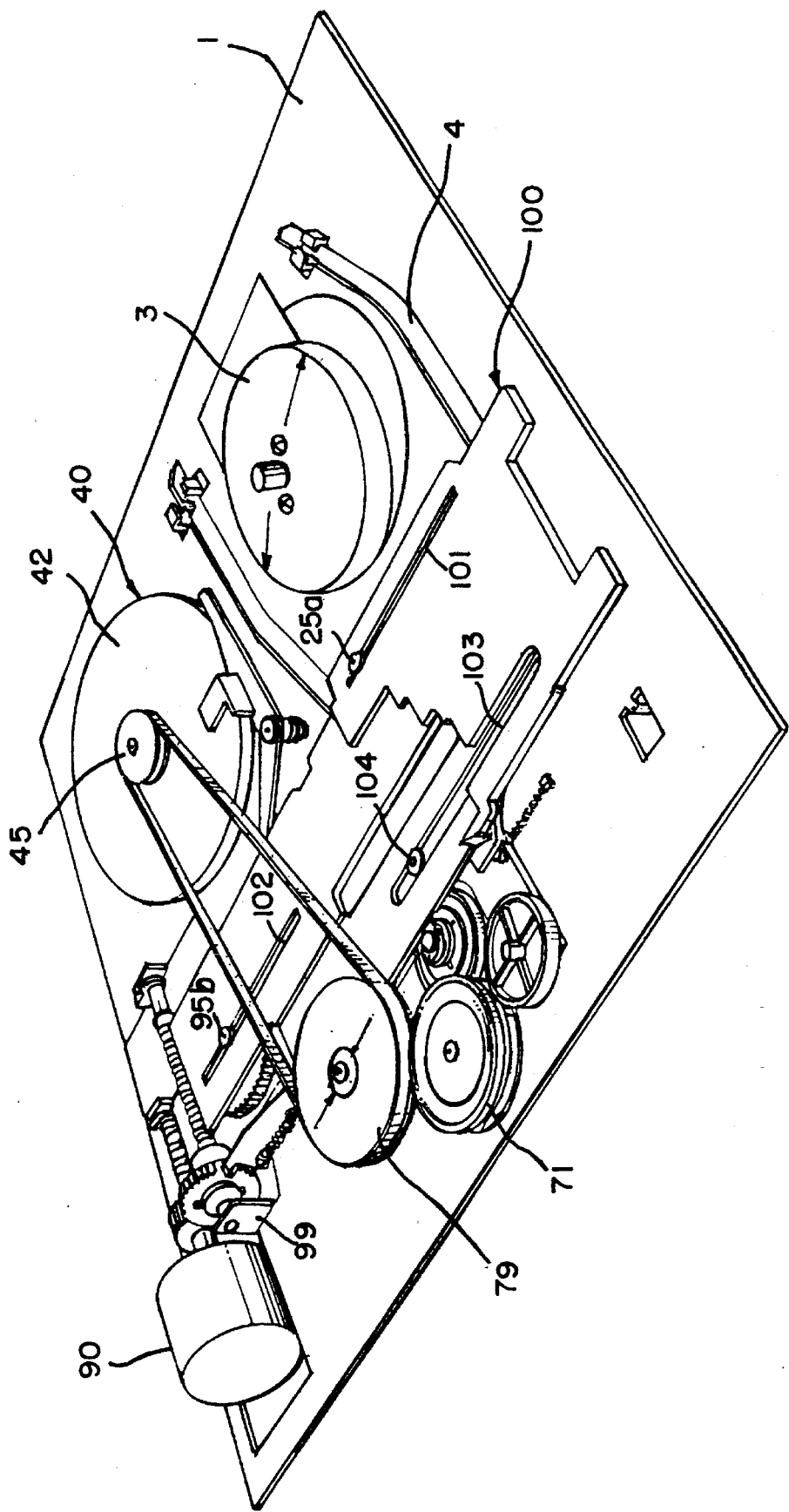
Figure 4:
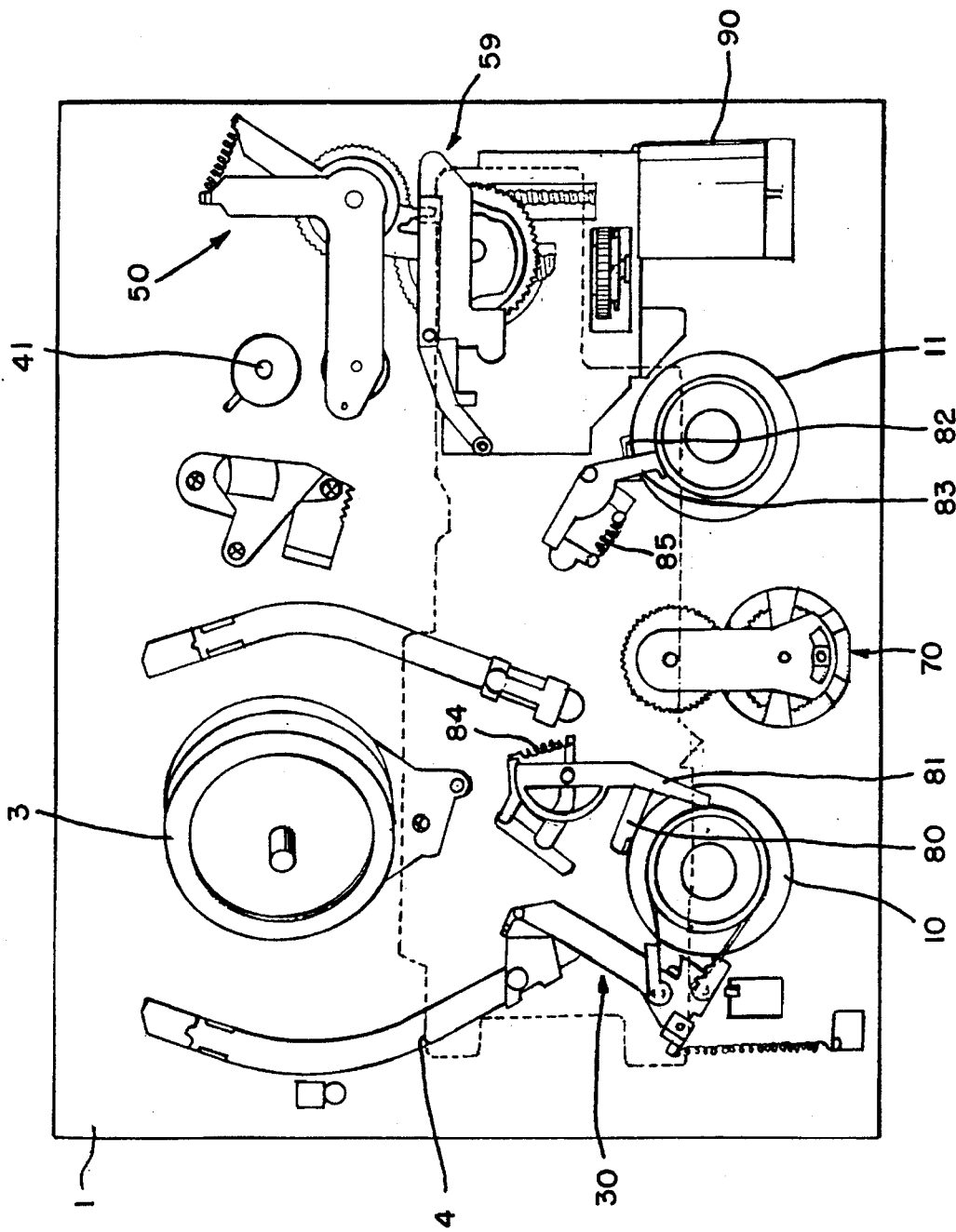
Figure 5:
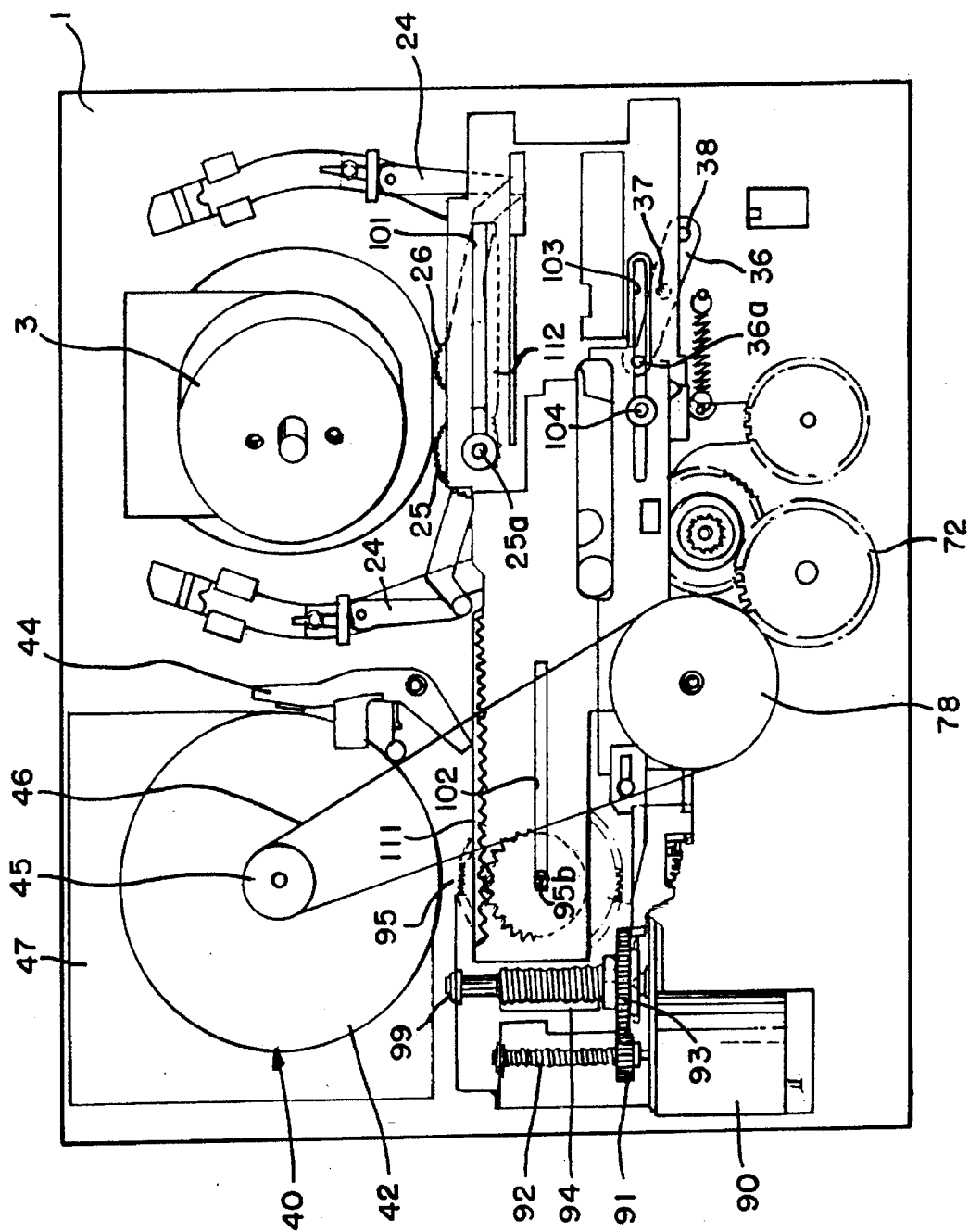

FIG. 1 is a schematic plan view of the overall construction of a VCR deck mechanism equipped with a fast winding device in accordance with the present invention. FIG. 2 is a perspective plan view of the VCR deck mechanism of FIG. 1. FIG. 3 is a perspective bottom view of the VCR deck mechanism of FIG. 1. FIG. 4 is a plan view of the VCR deck mechanism of FIG. 1. FIG. 5 is a bottom view of the VCR deck mechanism of FIG. 1. As shown in the drawings, the deck mechanism includes a base plate 1 and a head base 2 fixedly mounted to the rear portion of the base plate 1. A rotation head drum 3 is mounted at a slant on the head base 2. At the front portion of the base plate 1, a supply reel 10 and a take-up reel 11 are disposed to be spaced from each other. In both sides of a head drum 3, a pair of loading guide slots 4 are formed in the base plate 1, respectively.

A guide roller 5 and an erase head 6 are disposed to one side of the head drum 3. At the other side of the head drum 3, an audio control head assembly 7 is disposed.

As shown in FIG. 2, a slant, post assembly 20 is received in each loading guide slot 4 to slide along the loading guide slot 4 forwardly and rearwardly.

Each slantpost assembly 20 includes a slant post base 21 coupled to the loading guide slot 4, a slant post 22 mounted on the slant post base 21, and a guide roller 23 mounted on the slant post base 21. As shown in FIG. 5, the slant post assemblies 20 are connected to a first loading gear 25 and a second loading gear 26 both rotatably mounted to the base plate 1, by means of link type loading arms 24, respectively.

In one side of the supply reel 10, a tension adjusting mechanism 30 is disposed which includes a tension adjusting arm 31 pivotally mounted at one end thereof to the base plate 1 and a tension adjusting post 31a fixedly mounted to the other end of the tension adjusting arm 31, as shown in FIG. 2. A capstan motor 40 having a capstan shaft 41 (FIG. 4) and a capstan rotor 42 (FIG. 5) is disposed in one side of the audio control head assembly 7, as shown in FIG. 3. In one side of the capstan motor 40, a pinch arm 60 is pivotally mounted to a shaft 51 fixed to the base plate 1, as shown in FIG. 2. The pinch arm 60 has a pinch roller 62 rotatably mounted to one end, namely, the front end of the pinch arm 60 and a tape guide pin 63 mounted to the front end of the pinch arm 60 forwardly of the pitch roller 62.

As shown in FIG. 2, a take-up arm 65 is connected at one end thereof to the pinch arm 60. A take-up post 66 is mounted to the other end of the take-up arm 65.

Inside of the supply reel 10, a supply-side main brake 80 and a supply-side soft brake 81 are disposed, as shown in FIG. 4. These brakes 80 and 81 are connected to each other by means of a supply-side brake spring 84. In similar, a take-up-side main brake 82 and a take-up-side soft brake 83 are disposed inside of the take-up reel 11 and connected to each other by means of a take-up-side brake spring 85.

In the rear end of each loading guide slot 4, a V-shaped stopper 27 is fitted which serves to stop a movement of the corresponding slant post assembly 20, as shown in FIG. 2.

A tension band 34 is connected at both ends thereof to the tension adjusting arm 31 by means of a first connecting lever 32 and a second connecting lever 33, respectively. The tension band 34 is wrapped round the outer circumferential surface of the supply reel 10. A tension spring 35 is also connected at one end thereof to the tension adjusting mechanism 30. The other end of the tension spring 35 is fixedly mounted to the base plate 1.

As shown in FIG. 5, a tension transmission lever 36 adapted to drive the tension adjusting arm 31 is pivotally mounted at one end thereof to the base plate 1 to pivot about a pin 36a. The tension transmission lever 38 has at the other end thereof a protrusion 38 for forcing the tension transmission lever 36 to pivot.

The capstan motor 40 fixedly mounted to the lower surface of the base plate 1 is electrically connected to a circuit board 47. As shown in FIG. 4, the capstan shaft 41 of the capstan motor 40 is protruded upwardly from the base plate 1 and has a lower end to which a pulley 45 is fixedly mounted (FIG. 3). A capstan brake 44 is disposed near the capstan motor 40 to selectively come into contact with the capstan rotor 42. The pulley 45 is integral with the capstan rotor 42.

An idler mechanism 70 is mounted on the base plate 1 between the supply reel 10 and a take-up reel 11. As shown in FIGS. 2 through 4 and FIGS. 17A and 17B, the idler mechanism 70 includes an output gear 72 rotatably mounted on a shaft 75a fixed to the base plate 1, and a holder 78 rotatably mounted on the shaft 75a beneath the output gear 72. The holder 78 has a hollow shaft portion fitted at its upper end in a hollow shaft portion of the output gear 72. Around the shaft portion of holder 78, a clutch gear 71 including an upper gear 71a and a lower gear 71b is rotatably mounted between the output gear 72 and the holder 78. The idler mechanism 70 further includes an idler gear 73 rotatably mounted to one end of an idler arm 74 pivotally mounted on the shaft 75a. Felts 75 and 76 are interposed between the holder 78 and the lower gear 71b and between the lower gear 71b and the upper gear 71a, respectively. A compression coil spring 77 is disposed around the shaft portion of the output gear 72 between the output gear 72 and the upper gear 71a.

A pulley gear 79 is rotatably mounted to the lower surface of base plate 1 and engaged with the lower gear 71b of the clutch gear 71 and connected with the pulley 45 of the capstan rotor 42 by a belt 46.

The idler gear 73 rotatably mounted to one end of the idler arm 74 is engaged with the output gear 72.

A pinch drive assembly 50 is provided for driving the pinch roller 62 between a tape loading position and a tape unloading position, as shown in FIG. 2. The pinch drive assembly 50 includes a rotatable cylindrical cam 52 having a spiral cam groove 52a at its outer circumferential surface, an input gear 53 formed at the lower end of the cylindrical cam 52, a reciprocating cylinder 54 fitted around the cylindrical cam 52 to move upwardly or downwardly according to a rotation of the cylindrical cam 52, and a pinch roller actuating gear 98 engaged with the input gear 53 to rotate the cylindrical cam 52.

The cylindrical cam 52, the reciprocating cylinder 54 and the pinch arm 60 are coupled, in this order, to the shaft 51. A support lever 55 is provided at the upper end of the reciprocating cylinder 54. The support lever 55 is connected with the other end, namely, the rear end of the pinch arm 60 by a tension coil spring 64, as shown in FIG. 2.

The reciprocating cylinder 54 has at its lower end a guide protrusion 56, a cam lever 57 and a cam protrusion 58, as shown in FIG. 2. The cam protrusion 58 is engaged in the spiral cam groove 52a of the cylindrical cam 52. The guide protrusion 56 is engaged in a guide groove 59a of a guide and support member 59 fixedly mounted to the base plate 1 in one side of the reciprocating cylinder 54 and adapted to guide a reciprocating movement of the reciprocating cylinder 54. The cam lever 57 extends through a guide hole 59b of the guide and support member 59.

The cam lever 57 of the reciprocating cylinder 54 is provided at its free end with a cam pin 57a engaged in a pressing cam groove 98c (FIGS. 18A and 18B) formed at the pinch roller actuating gear 98.

Figure 18A:
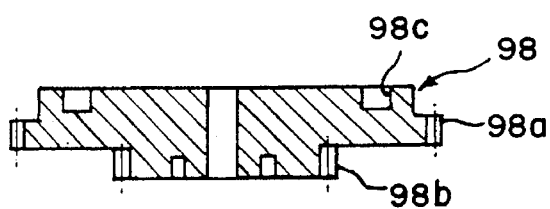
FIG. 18A is a sectional view of a pinch roller actuating gear.
Figure 18B:
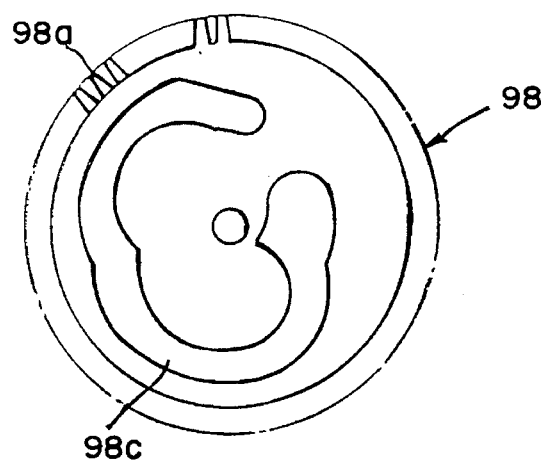
FIG. 18B is a plan view of the pinch roller actuating gear.

As shown in FIG. 2 and FIGS. 18A and 18B, the pinch roller actuating gear 98 includes a larger gear portion 98a and a smaller gear portion 98b integral with the larger gear portion 98a. The larger gear portion 98a of the pinch roller actuating gear 98 is engaged with the input gear 53 of the cylindrical cam 52. As mentioned above, the pinch roller actuating gear 98 further includes the pressing cam groove 98c in which the cam pin 57a of the cam lever 57 is pressed.

The take-up arm 65 supporting the take-up post 66 at the other end thereof is provided at one end thereof with a gear portion 67 engaged with the pinch roller actuating gear 98.

Figure 16:
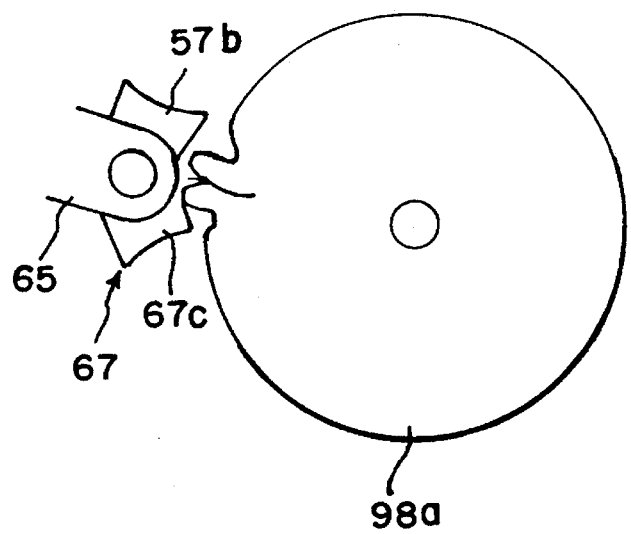
Figure 17A:
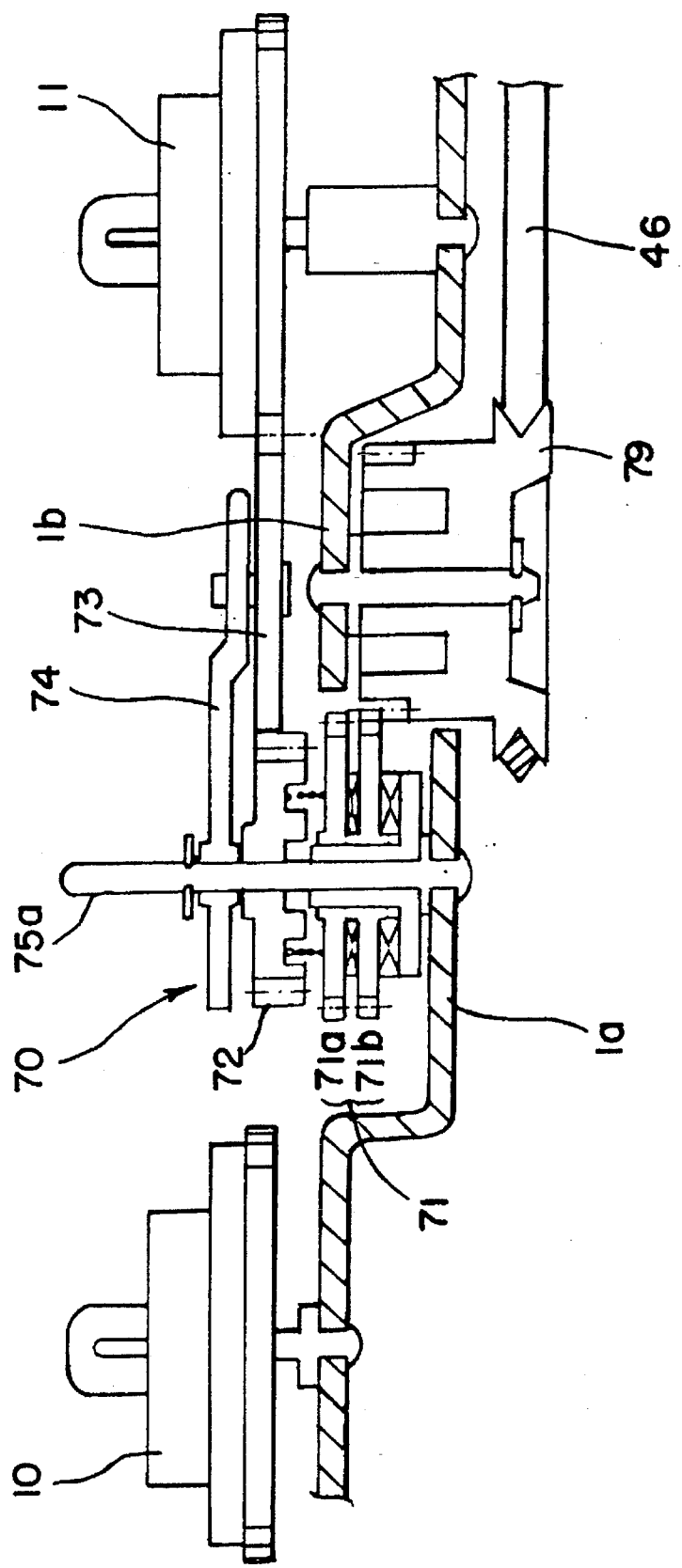
FIGS. 17A and 17B are sectional views of an idler mechanism, respectively.
Figure 17B:
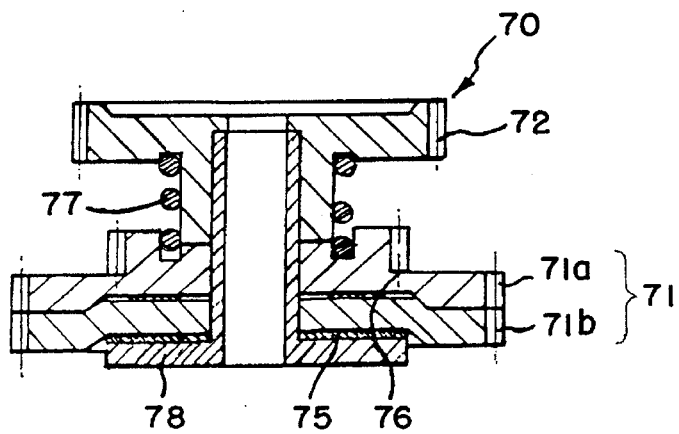

As shown in FIG. 16, the gear portion 67 of the take-up arm 65 includes a tooth 67a and a pair of arc-shaped contacts 67b and 67c disposed in both sides of the tooth 67a. By this construction of the gear portion 67, the take-up post 66 of the take-up arm 65 is moved through a predetermined angle and then maintained at the moved position when the pinch roller 62 of the pinch arm 60 moves to its tape loading position by a rotation of the pinch rot let actuating gear 98 in one direction. Similarly, when the pinch roller 62 of the pinch arm 60 moves to its tape unloading position by a rotation of the pinch roller actuating gear 98 in the reverse direction, the take-up post 66 is reversely moved from the above-mentioned position through a predetermined angle and then maintained at the moved position.

At the lower surface of the base plate 1, an actuating plate 100 is disposed, as shown in FIG. 3. The actuating plate is adapted to move tape take-out and travel guiding elements such as the slant post assemblies 20, the pinch roller 62 and the take-up post 66 between their tape loading and unloading positions and convert the operation mode. A loading motor 90 is fixedly mounted to the base plate 1 to the right side of the take-up reel 11.

Figure 6:
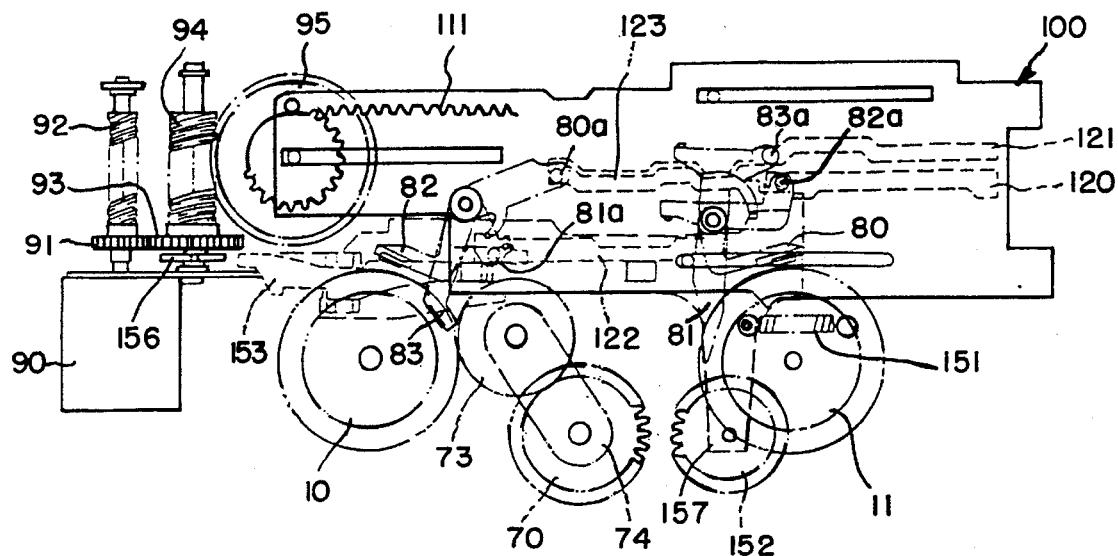
Figure 7:
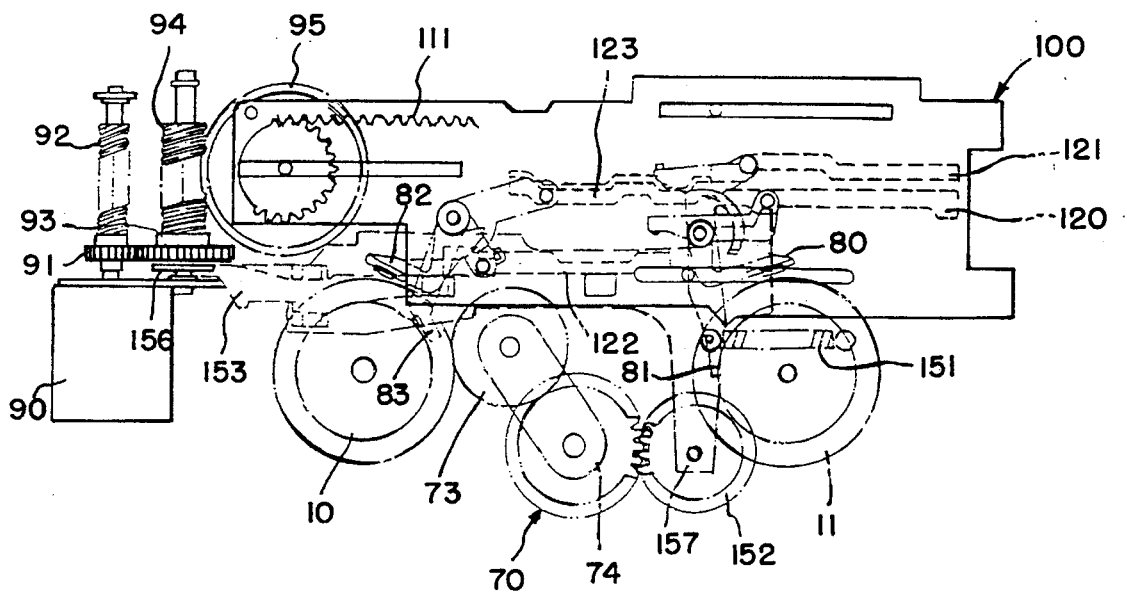

The loading motor 90 has a shaft provided with a first spur gear 91 and a first worm 92 integral with the first spur gear 91, as shown in FIG. 5. Disposed in parallel to the shaft of loading motor 90 are a second spur gear 93 and a second worm 94 integral with the second spur gear 93. The second spur gear 93 is engaged with the first spur gear 91. The second worm 94 is disposed between the base plate 1 and the actuating plate 100 and engaged with an actuating gear 95 rotatably mounted to the lower surface of base plate 1, as shown in FIGS. 6 and 7.

Figure 14:
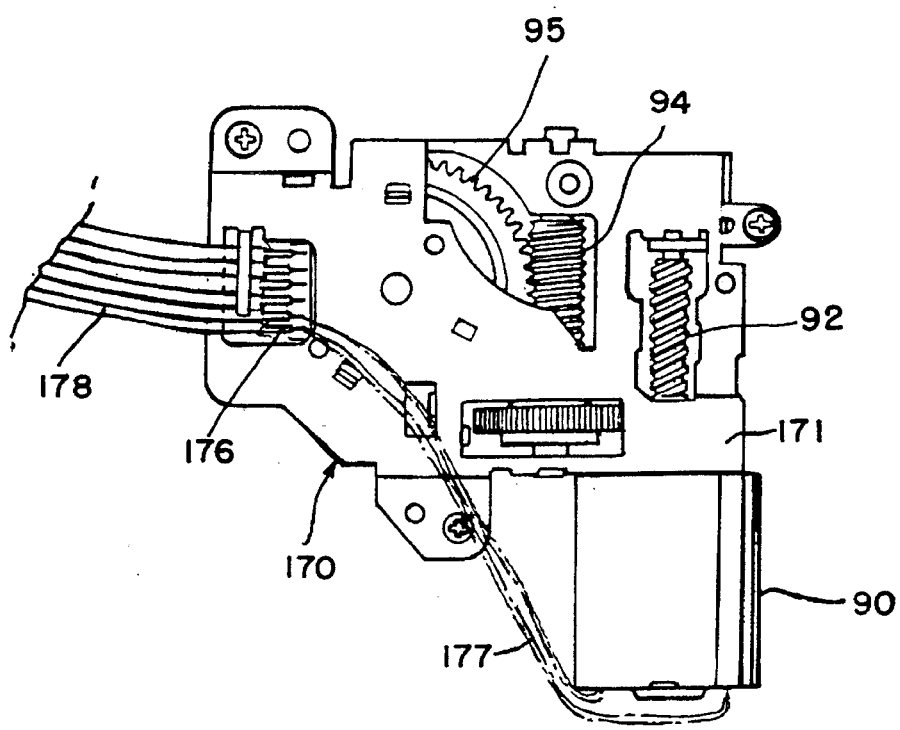
Figure 14:
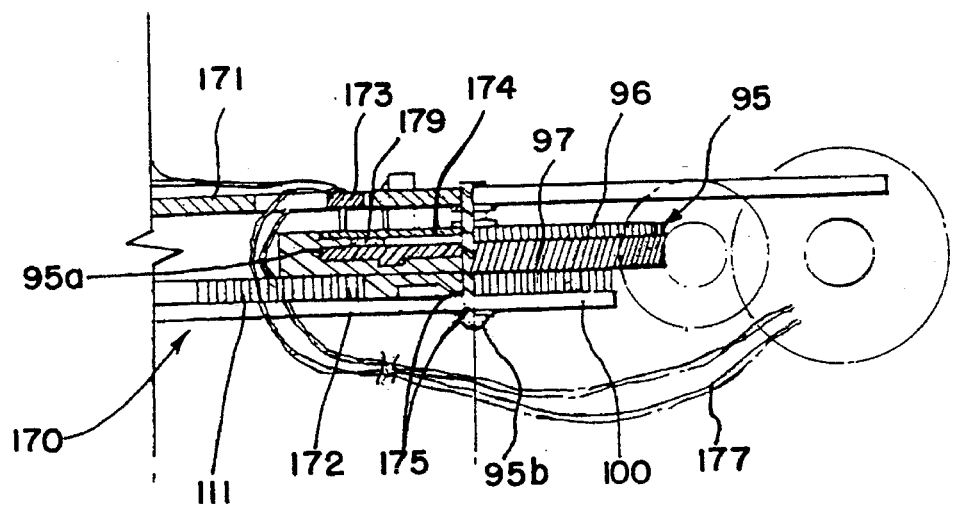

The actuating gear 95 has a larger gear 96 and a smaller gear 97 both integrally formed therewith, as shown in FIG. 14B. The smaller gear 97 has teeth partially formed at its circumferential surface. The larger gear 96 of the actuating gear 95 is engaged with the smaller gear portion 98b of the pinch roller actuating gear 98.

Figure 15:
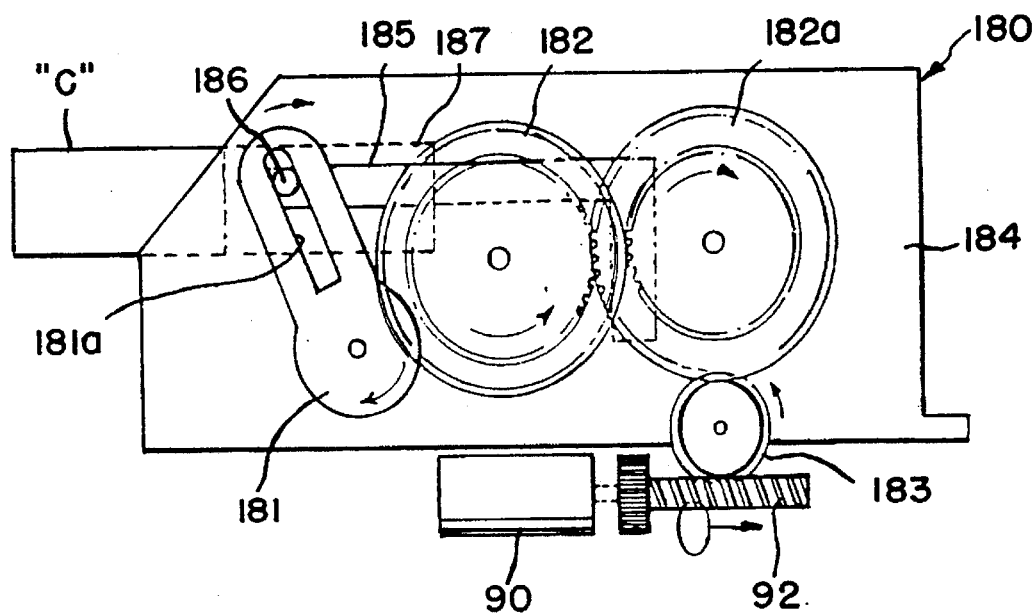

On the base plate 1, a front loading housing 180 for a tape cassette is installed, as shown in FIG. 15.

The front loading housing 180 includes a pair of parallel brackets 184 fixedly mounted to both side portions of the base plate 1, respectively, and each having a 180°-turned L-shaped guide slot 185, an arm gear 181 having a guide slot 181a, a transmission idler gear 182 engaged with the arm gear 181, a transmission gear 182a engaged with the transmission idler gear 182, a worm gear 183 engaged with the transmission gear 182a and the first worm 92 of the loading motor 90, and a cassette holder 187 mounted between the brackets 184 to move horizontally and vertically along the guide slots 185 of the brackets 184 and having a pair of guide pins 186 respectively engaged in the guide slots 185. All the arm gear 181, the transmission idler gear 182, the transmission gear 182a and the worm gear 183 are rotatably mounted to one of the brackets 184.

Figure 20A:
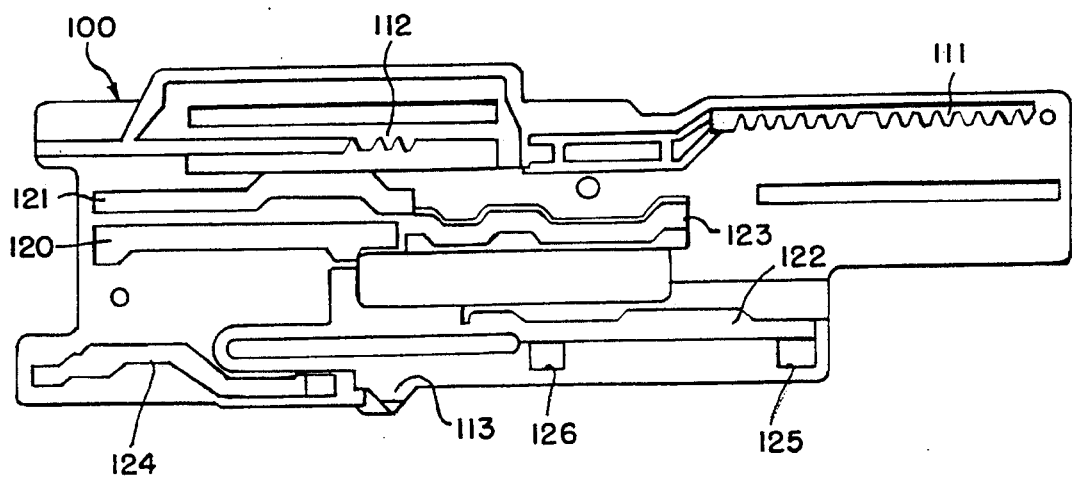
FIG. 20A is a plan view of the actuating plate shown in FIG. 19.
Figure 20B:
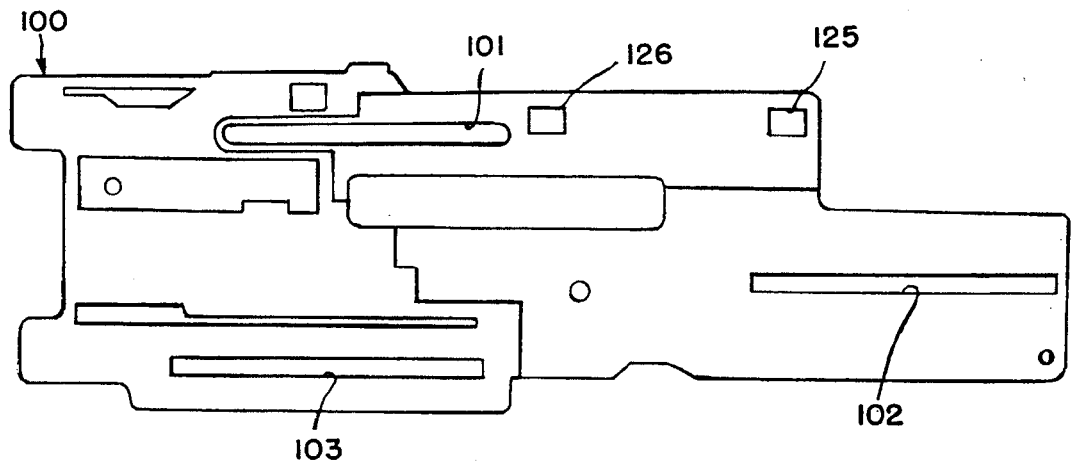
FIG. 20B is a bottom view of the actuating plate shown in FIG. 19.
Figure 21:
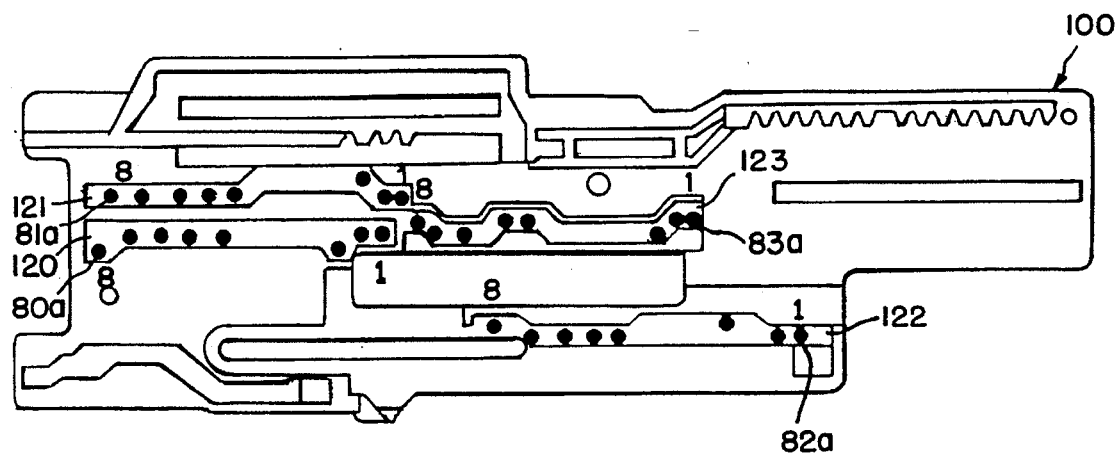

As shown in FIGS. 20A, 20B and FIG. 21, the actuating plate 100 has guide slots 101, 102 and 103 for receiving a shaft 25a of the first loading gear 25, a shaft 95b of the actuating gear 95 and a guide pin 104 fixedly mounted to the lower surface of base plate 1, respectively. By this construction, the actuating plate 100 is linearly laterally movable while being guided by the shafts 25a and 95b and the guide pin 104.

At the right upper portion of the upper surface of actuating plate 100, a first rack 111 is formed which is engaged with the smaller gear 97 of actuating gear 95.

With the above-mentioned construction, as the loading motor 90 drives, three functional parts, namely, the pinch drive assembly 50, the actuating plate 100 and the front loading housing 180 are simultaneously operated.

In other words, the rotation of the loading motor 90 forces the first and second worms 92 and 94 to rotate. As the first worm 92 rotates, the worm gear 183 of front loading housing 180 engaged with the first worm 92 rotates, thereby causing the front loading housing 180 to be linearly moved. As the second worm 93 rotates, the actuating gear 95 engaged with the second worm 93 rotates, so that the actuating plate 100 engaged with the actuating gear 95 can be operated. By the rotation of the actuating gear 95, the pinch roller actuating gear 98 engaged with the actuating gear 95 rotates, thereby causing the pinch drive assembly 50 to operate.

Since the three functional parts including the pinch drive assembly 50, the actuating plate 100 and the front loading housing 180 can be operated by the single loading motor 90 in accordance with the present invention, it is possible to obtain a light, thin, simple and compact construction and reduce the manufacture cost.

This construction capable of operatively connecting three different functional parts to the single loading motor has not been conventionally known.

The deck mechanism further includes a mode switch unit 170 for sensing an operation mode of the deck mechanism. As shown in FIGS. 14A and 14B, the mode switch unit 170 has a mode switch circuit board 171 fixedly mounted to the base plate 1 above the actuating gear 95 and a mode sensing annular rotation plate 172 received in an annular recess 95a provided at the upper surface of the actuating gear 95 to rotate together with the actuating gear 95. Over the mode sensing rotation plate 172, a mode sensing circuit board 174 is fixed to the mode switch circuit board 171 by means of a fixture 179.

The mode sensing circuit board 174 has a copper foil pattern whereas the mode sensing rotation plate 172 has a contact adapted to come into contact with the copper foil pattern of mode sensing circuit board 174 during a rotation of the mode sensing rotation plate 172. Accordingly, the mode sensing switch unit 170 can sense various operation modes respectively corresponding to various contact positions obtained between the copper foil pattern and the contact during the mode sensing rotation plate 172 rotates together with the actuating gear 95.

A connector 173 is connected to the mode sensing circuit board 174. In FIGS. 14A and 14B, the reference numeral 175 denotes a washer, 177 denotes signal lines for connecting a signal connecting terminal provided at the mode sensing circuit board 174 to a terminal of the loading motor 90, and 178 denotes signal lines for connecting the connector 173 to a control unit (not shown).

As shown in FIGS. 14A and 14B, all elements of the mode sensing switch and drive units including the loading motor 90, a plurality of power transmission gears, the actuating gear 95 and the mode sensing switch 170 are mounted on the mode switch circuit board 171. Therefore the mode sensing switch and drive units can be handled as a single assembly.

Although a conventional mode sensing switch unit is driven by use of a separate gear, the mode sensing switch unit 170 of the present invention is driven by the operation of actuating gear 95. Accordingly, the present invention provides advantages of a light, thin, simple and compact construction and a reduction in manufacture cost.

As shown in FIGS. 20A and 20B and FIG. 21, the actuating plate 100 has at the middle portion of the upper surface thereof a plurality of actuating grooves, namely, a supply-side main brake actuating groove 120, a supply-side soft brake actuating groove 121, a take-up-side main brake actuating groove 122, and a take-up-side soft brake actuating groove 123. These grooves 120, 121, 122 and 123 receive actuating protrusions 80a, 80b, 80c and 80d protruding from the supply-side main brake 80, the supply-side soft brake 81, the take-up-side main brake 82 and the take-up-side soft brake 83, respectively. By this construction, the lateral movement of the actuating plate 100 causes the supply reel 10 and the take-up reel 11 to be braked or released. The actuating plate is also at the left lower portion of the upper surface thereof with a middle lever actuating groove 124 for receiving an actuating protrusion 37 provided at the middle portion of the tension transmission lever 36. By this construction, the tension transmission lever 36 and the tension adjusting arm 31 are operatively connected to the actuating plate 100.

A second rack 112 is formed at the upper middle portion of the upper surface of actuating plate 100. The second rack 112 is engaged with the first loading gear 25 so that it rotates the first loading gear 25 and thus the second loading gear 26 when the actuating plate 100 moves laterally. By the rotations of the first and second loading gears 25 and 26, the slant post assemblies 20 connected to the loading gears 25 and 26 by the link type loading arms 24 are moved to their loading or unloading positions, respectively.

In conventional constructions, it is necessary for provisions of a cam gear for transmitting a motor power and a complicated transmission construction for transmitting a drive force of the cam gear to loading gears, in order to rotate the loading gear and thereby move slant post assemblies. In accordance with the present invention, however, the construction for driving the loading gears is very simple because the first loading gear 25 is driven by the second rack 112 of the actuating plate 100.

A third rack 113 is also provided at the middle portion of the lower edge of actuating plate 100. This third rack 113 is engaged with a jog clutch gear assembly 160 rotatably mounted to the bottom surface of the base plate 1 so as to prevent a tape from being loosened in a JOG mode. By this construction, the tape can maintain a uniform tension.

Figure 11:
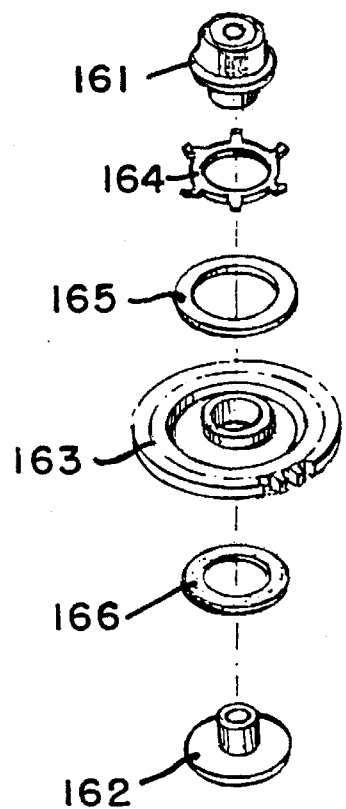
Figure 12:
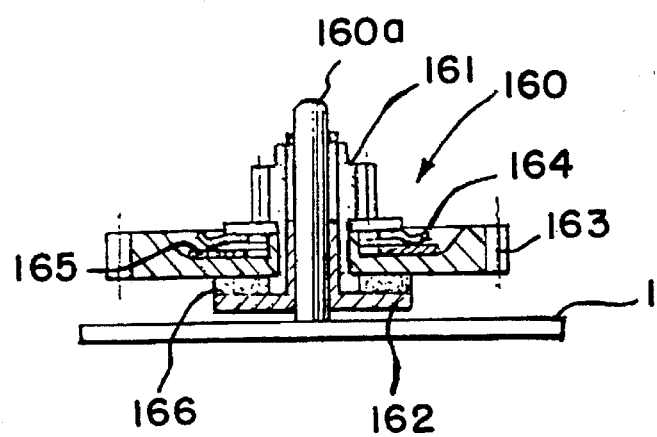
Figure 13:
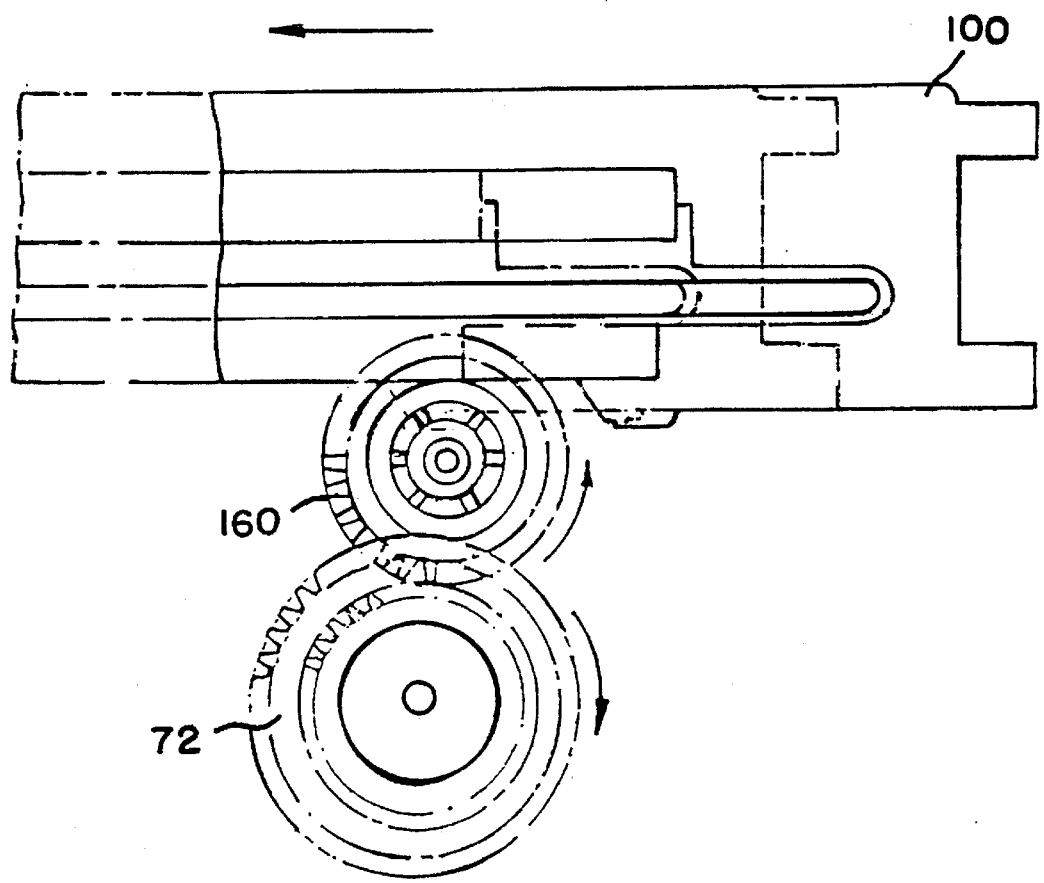

As shown in FIGS. 11 through 13, the jog clutch gear assembly 160 includes an input gear 161 and a holder 162 both rotatably mounted on a shaft 160a fixed to the base plate 1. The holder 162 has a hollow shaft portion fitted at its upper end in a hollow shaft portion of the input gear 161. Around the shaft portion of input gear 161, an output gear 163 is interposed between the input gear 161 and the holder 162, Felts 165 and 166 are interposed between the input gear 161 and the output gear 163 and between the output gear 163 and the holder 162, respectively. A plate spring 164 is disposed between the input gear 161 and the output gear 163, As mentioned above, the pinch arm 60 has the pinch roller 62 rotatably mounted to one end, namely, the front end of the pinch arm 60 and a tape guide pin 63 mounted to the front end of the pinch arm 60 forwardly of the pinch roller 62. As the pinch arm 60 pivots by the pinch drive assembly 50 and comes into contact with the capstan shaft 41, the guide post 63 comes into contact with the back surface, namely, the surface opposite to the recording surface of the tape in one side of the capstan shaft 41. As a result, the tape is guided without damage.

In conventional constructions, a guide post adapted to guide stable travel of the tape along a given travel path in one side of the capstan shaft is fixedly mounted to the base plate. The conventional guide post guides the travel of tape under a condition that it is in contact with the recording surface of the tape. As a result, the recording surface of the tape may be worn and damaged due to a friction generated between the recording surface and the guide post. This results in a shortened life of the tape and a noise in reproducing signals. In accordance with the present invention, however, a unique construction is provided in which the guide post 59 fixedly mounted to the front end of pinch arm 60 moves to its tape guide position together with the pinch arm 60 and comes into contact with the back surface of tape at its tape guide position to guide the tape. As a result, it is possible to prevent the tape from being damaged. This provides advantages of an extended tape life and a maintenance of distinct reproducing signals.

To one end of the pinch arm 60, the take-up arm 65 is connected at one end thereof, as mentioned above. To the other end of the take-up arm 65, the take-up post 66 is mounted.

Between the lower surface of base plate 1 and the actuating plate 100, a plate 150 for a fast winding mode is interposed to move laterally linearly.

Figure 8:
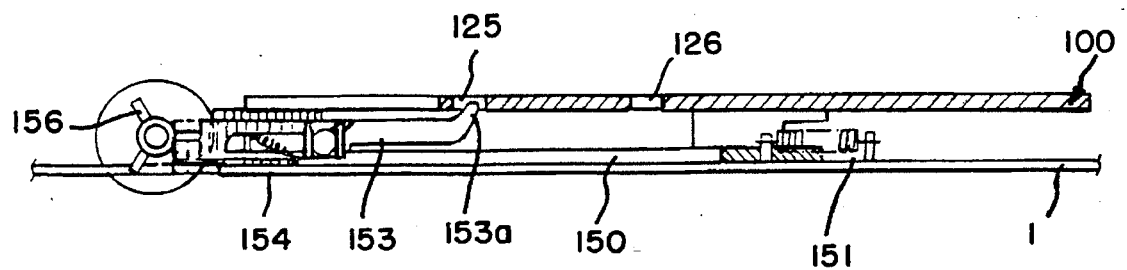
Figure 9A:
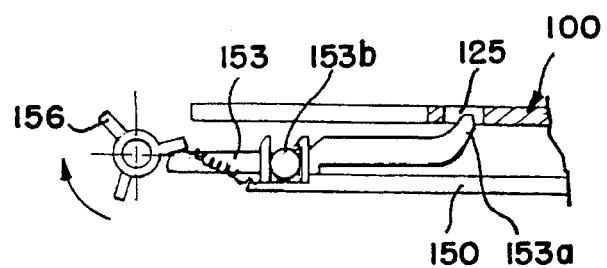
Figure 9B:
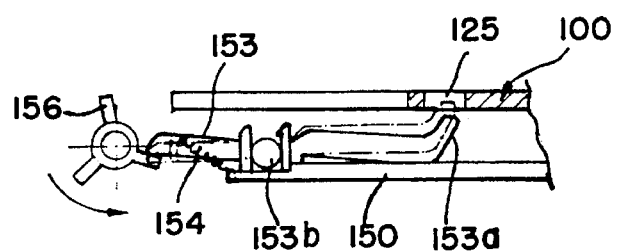

As shown in FIG. 8 and FIGS. 9A and 9B, the plate 150 is connected at one end thereof to one end of a tension coil spring 151 which is connected at the other end thereof to the base plate 1. By the tension coil spring 151, the plate 150 can return to its original position after completion of its operation in the fast winding mode. As shown in FIG. 19, the plate 150 also has an extension 157. To the end of the extension 157, a fast forward/rewind (FF/REW) gear 152 is rotatably mounted which is directly engaged with the idler mechanism 70 so as to transmit a high speed power.

The FF/REW gear 152 is permitted to be engaged with the idler mechanism 70 at its tape loading and unloading positions to perform the FF/REW mode.

A lock lever 153 is pivotally coupled to the other end of the fast winding plate 150 by means of an axial pin 153b. The lock lever 153 has a bent portion 153a at one end thereof. A tension coil spring 154 is connected between the plate 150 and the lock lever 153. For engaging with the bent portion 153a of lock lever 153, the actuating plate 100 has a first fast winding actuating groove 125 and a second fast winding actuating groove 126, as shown in FIG. 8.

The fast winding plate 150 further includes an actuating portion 150a for actuating the supply-side main brake 80 and an actuating portion 150b for actuating the take-up-side main brake 82.

Figure 22:
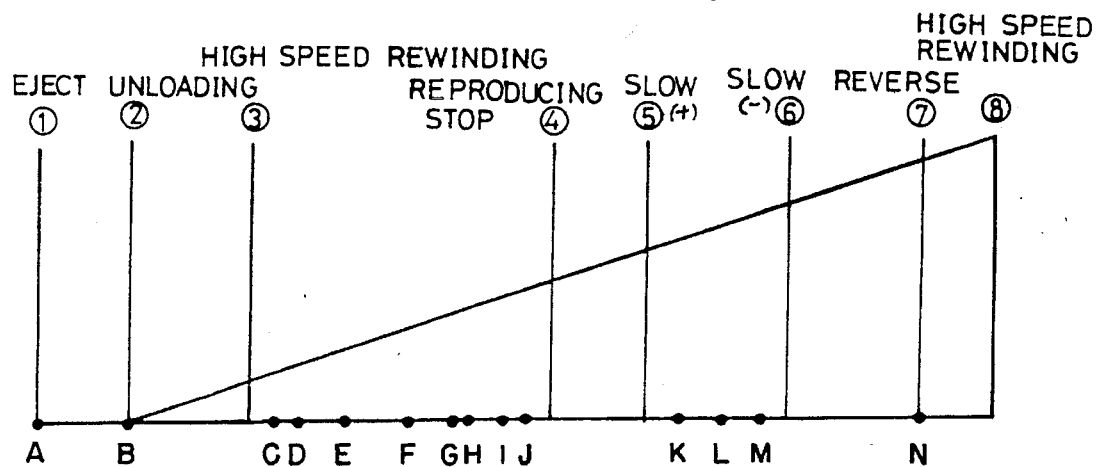

FIGS. 21 and 22 illustrate an example of an operation mode change in accordance with the present invention. FIG. 21 shows a condition that respective actuating pro,fusions 80a, 80b, 80c and 80d of the brakes 80, 81, 82 and 83 are received in corresponding actuating grooves 120, 121, 122 and 123 of the actuating plate 100. FIG. 22 is a graph showing the progress of operation modes. As shown in FIG. 22, the operation proceeds in the order of (1) eject mode→ (2) unloading mode→(3) fast winding mode at unloading state→ (4) reproducing and stop mode→(5) and (6) slow mode→(7) rewinding mode→(8) fast winding mode at loading state.

As shown in FIG. 22, the operation modes (1) to (4) are subdivided into a plurality of sub-modes proceeding in the order of A: front loading operation starting→B: tape cassette seating→C: take-up driving starting→D: loading starting→ E: take-up driving ending and tape take-out and pinch roller lowering starting→F: pinch roller lowering ending→G: loading ending and slant post assemblies pressing ending→ H: pinch roller pressing starting→I: tension arm driving ending→J: pinch roller pressing ending. The operation modes (5) to (8) proceed in the order of K: pinch roller separating→L: tension arm separating→M: pinch roller pressing→N: pinch roller separating and tension arm separating. FIG. 21 shows respective positions of actuating protrusions 80a to 83a of brakes 80 to 83 corresponding to the operation modes (1) to (8) proceeding in the order shown in FIG. 22.

Of course, the deck mechanism of the present invention may not operate in the order shown in FIGS. 21 and 22. If desired, the operation modes may be changed.

When a tape cassette is inserted into the front loading housing 180 to be loaded at the unloaded state shown in FIGS. 2, 4 and 6 so as to perform a desired operation mode such as play mode, the loading motor 90 rotates in a normal direction, thereby causing the first and second worms 92 and 94 to rotate. By the rotations of the first and second worms 92 and 94, the worm gear 183 of front loading housing 180 engaged with the first worm 92 rotates to move the front loading housing 180. As a result, the tape cassette is fed to the interior of the deck mechanism and then seated on both the supply reel 10 and the take-up reel 11. At this time, the actuating gear 95 engaged with the second worm 94 rotates to move the actuating plate 100 engaged with the actuating gear 95. The movement of the actuating plate 100 results in a rotation of the first loading gear 25 engaged with the second rack 122 of actuating plate 100 and thus a rotation of the second loading gear 26. As the first and second loading gears 25 and 26 rotates, the slant post assemblies 20 connected to the loading gears 25 and 26 by the link type loading arms 24 move toward the rotation head drum 3 while carrying the tape. The pinch roller actuating gear 98 engaged with the actuating gear 95 also rotates to drive the pinch drive assembly 50, thereby causing the pinch roller 62 and the take-up post 66 to move respective loading positions thereof. Thus loading of the tape is completed.

At this state, an operation mode such as play mode or reverse play mode can be performed while the tape is fed in either a normal or reverse direction by a frictional force generated by the capstan shaft 41 and the pinch roller 62 in rotation of the capstan motor 40. At this time, a selected one of the supply reel 10 and the take-up reel 11 is rotated by the drive power of the capstan motor 40 transmitted by the idler mechanism 70 via the belt 46.

When the tape is to be unloaded at the loaded state after completion of the operation mode such as play mode, the loading motor 90 rotates in the reverse direction, thereby causing the first and second worms 92 and 94 to rotate reversely. By the reverse rotations of the first and second worms 92 and the worm gear 183 of front loading housing 180 engaged with the first worm 92 rotates to move the front loading housing 180 in the reverse direction. As a result, the tape cassette is fed outwardly from the interior of the deck mechanism so as to be ejected from the front loading housing 180. By the rotation of second worm 94, the actuating gear 95 rotates to move the actuating plate 100 engaged with the actuating gear 95. As a result, the first loading gear 25 and the second loading gear 26 rotate reversely, so that the slant post assemblies 20 move toward the supply reel 10 and the take-up reel 11, respectively. The pinch roller actuating gear 98 engaged with the actuating gear 95 also rotates to drive the pinch drive assembly 50, thereby causing the pinch roller 62 and the take-up post 66 to move to respective unloading positions thereof. Thus, unloading of the tape is completed.

When a fast winding operation is to be performed at the tape unloaded state shown in FIG. 6, the actuating plate 100 is slightly moved in a rightward direction by the drive power of the loading motor 90. At this time, the fast winding plate 150 moves in a rightward direction together with the actuating plate 100 under a condition that the bent portion 153a of lock lever 153 is engaged in the first fast winding actuating groove 125. As a result, the FF/REW gear 152 mounted to the extension 157 of fast winding plate 150 is engaged with the idler mechanism 70, as shown in FIG. 7. At this time, the supply-side main brake 80 and the take-up-side main brake 82 are separated from the supply reel 10 and the take-up reel 11, by the actuating portions 150a and 150b of fast winding plate 150, respectively. As the FF/REW gear 152 is engaged with the idler mechanism 70, the drive power of capstan motor 40 can be directly transmitted to the FF/REW gear 152 so as to rotate the supply reel 10 or the take-up reel 11 at a high speed. Thus, fast winding and rewinding can be performed.

Figure 10:
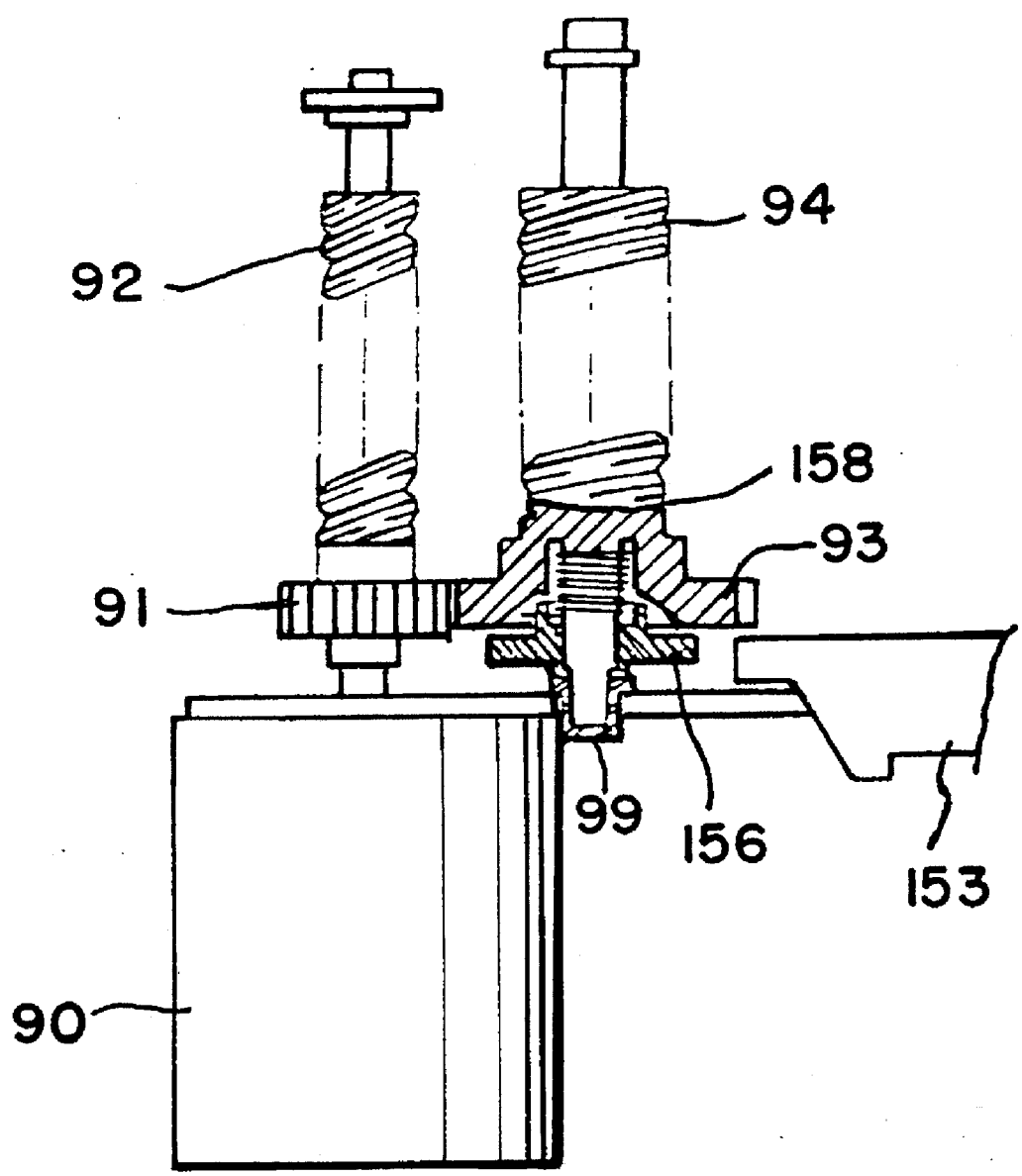

Beneath the second spur gear 93 integral with the second worm 94, a ratchet 156 for releasing the locked state of the lock lever 153 is mounted on a shaft portion of the second spur gear 93 by means of a one-directional clutch spring 158 and to the base plate 1 through a bracket 99, as shown in FIGS. 3 and 10. Upon stopping the fast winding operation, the ratchet 156 allows the supply-side main brake 80 and the take-up-side main brake 82 to perform a sudden braking operation.

In other words, when the loading motor 90 rotates slightly in the reverse direction for stopping the tape fast winding operation, the second worm 94 and the second spur gear 93 rotate reversely, so that the ratchet 156 strikes the lock lever 153, as shown in FIG. 9B. As a result, the bent portion 153a of lock lever 153 is separated from the first fast winding actuating groove 125 of the fast winding plate 150, thereby causing the fast winding plate 150 to be separated from the actuating plate 100. When the fast winding plate 150 is separated from the actuating plate 100, it returns rapidly to its original position by virtue of the spring force of the tension coil spring 154. Accordingly, the actuating portions 150a and 150b of fast winding plate 150 are released from their states pressing the supply-side main brake 80 and the take-up-side main brake 82, respectively. As a result, the supply-side main brake 80 and the take-up-side main brake 82 suddenly brake the supply reel 10 and the take-up reel 11, respectively.

When the fast winding operation is to be performed at the tape loaded state, the actuating plate 100 is slightly moved in a rightward direction by the drive power of the loading motor 90. At this time, the fast winding plate 150 moves in a rightward direction together with the actuating plate 100 under a condition that the bent portion 153a of lock lever 153 is engaged in the second fast winding actuating groove 126. As a result, the FF/REW gear 152 mounted to the extension 157 of fast winding plate 150 is engaged with the idler mechanism 70. At this time, the supply-side main brake 80 and the take-up-side main brake 82 are separated from the supply reel 10 and the take-up reel 11, by the actuating portions 150a and 150b of fast winding plate 150, respectively. As the FF/REW gear 152 is engaged with the idler mechanism 70, the drive power of capstan motor 40 can be directly transmitted to the FF/REW gear 152 so as to rotate the supply reel 10 or the take-up reel 11 at a high speed. Thus fast winding and rewinding can be performed.

For stopping the tape fast winding operation, the loading motor 90 rotates slightly in the reverse direction. By this rotation, the second worm 94 and the second spur gear 93 rotates reversely, so that the ratchet 156 strikes the lock lever 153. As a result, the bent portion 153a of lock lever 153 is separated from the second fast winding actuating groove 126 of the fast winding plate 150, thereby causing the fast winding plate 150 to be separated from the actuating plate 100. When the fast winding plate 150 is separated from the actuating plate 100, it returns rapidly to its original position by virtue of the spring force of the tension coil spring 154. Accordingly, the actuating portions 150a and 150b of fast winding plate 150 are released from their states pressing the supply-side main brake 80 and the take-up-side main brake 82, respectively. As a result, the supply-side main brake 80 and the take-up-side main brake 82 suddenly brake the supply reel 10 and the take-up reel 11, respectively.

Now, an operation in the jog mode will be described.

When a reverse freeing force is applied to the tape as the capstan shaft 41 rotates reversely in the play mode, the tape is loosened while the idler gear 73 is separated from the take-up reel 11 and then engaged with the supply reel 10. As a result, a noise is generated. In accordance with the present invention, when the actuating plate 100 moves slightly in a rightward direction in the play mode, the third rack 113 of actuating plate 100 is engaged with the jog clutch gear assembly 160, thereby causing the jog clutch gear assembly 160 to rotate. The rotation of jog clutch gear assembly 160 results in a rotation of the idler mechanism 70 engaged in the jog clutch gear assembly 160. As the idler mechanism 70 rotates, the idler gear 73 is engaged with the supply reel 10, so that the supply reel 10 rotates slightly in the reverse direction, thereby causing the tape to be taken up on the supply reel 10. Thus the loosening of the tape can be prevented.

As apparent from the above description, the present invention provides a fast winding device for a video cassette tape recorder capable of achieving a fast winding operation at both of tape loading and unloading states by use of a fast winding plate having an extension to which a FF/REW gear is mounted. Accordingly, the user can select the fast winding operation mode at both of tape loading and unloading states.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A fast winding device for a video cassette tape recorder including a supply reel and a take-up reel, said device comprising:

a base plate;

first and second motors mounted on said base plate;

an actuating plate movably mounted to said base plate and driven by said first motor for selective movement laterally linearly with respect to said base plate, said actuating plate having fast winding actuating means;

a fast winding mode plate movably mounted to said base plate and disposed between said base plate and said actuating plate and selectively movable laterally linearly with respect to said base plate along with said actuating plate from an original position to a fast winding position when engaged with said fast winding actuating means;

a resilient means connected at one end to said base plate and at an opposing end thereof to said fast winding mode plate for exerting a resilient bias for returning said fast winding mode plate to the original position when the fast winding mode plate is disengaged from the fast winding actuating means;

an extension portion formed on said fast winding mode plate;

an idler mechanism driven by said second motor and mounted on said base plate between said supply reel and said take-up reel and selectively engageable with said supply reel or said take up reel for transmitting rotational power thereto;

a fast-forward/rewind (FF/REW) gear rotatably mounted to said extension portion of said fast winding mode plate for being driven by said second motor and for directly engaging with said idler mechanism to transmit rotational power thereto when the fast winding mode plate is at said fast winding position;

a lock lever pivotally mounted to said fast winding mode plate for selectively engaging in a locking state with said fast winding actuating means to enable the fast winding mode plate to move together with said actuating plate, the lock lever being resiliently biased into said locking state by a spring; and a ratchet mounted to said base plate and driven by said first motor for selectively pivoting the lock lever against the spring bias to release the locking state of said lock lever with said fast winding actuating means such that the lock lever retracts from the fast winding actuating means and causes the fast winding mode plate to return to the original position by the action of the resilient means.

2. A fast winding device in accordance with claim 1, further comprising a supply-side main brake, a take-up side main brake, and an actuating portion formed on said fast winding mode plate for each of said supply-side main brake and said take-up side main brake for actuating said supply-side main brake and for actuating said take-up-side main brake for braking the supply and take-up reels, respectively, such that the brakes brake the reels when the fast winding mode plate is positioned at the original position.

3. A fast winding device in accordance with claim 2, wherein said ratchet for releasing the locking state of said lock lever is mounted to said base plate for rotational movement by a one-directional clutch spring so that upon stopping a fast winding operation, the ratchet causes said supply side main brake and said take-up side main brake to perform a sudden braking operation on the reels by causing the fast winding mode plate to return to the original position by releasing the locking state of said lock lever.

4. A fast winding device in accordance with claim 1, wherein said fast winding actuating means includes a first fast winding actuating groove and a second fast winding actuating groove.

* * * * *

UNITED STATES PATENT AND TRADEMARK OFFICE
CERTIFICATE OF CORRECTION

PATENT NO. : 5,472,151
DATED : December 5, 1995
INVENTOR(S) : Choi et al.

It is certified that error appears in the above-indentified patent and that said Letters Patent is hereby corrected as shown below:

In item [30] Foreign Application Priority Data on the title page of the patent, change "21992/1992" to --21991/1992--.

Signed and Sealed this

Nineteenth Day of May, 1998

Attest:

BRUCE LEHMAN

Attesting Officer  Commissioner of Patents and Trademarks